United States Patent [19]

Inoue

[11] Patent Number: 4,718,115

[45] Date of Patent: Jan. 5, 1988

[54] RADIO RECEIVER FOR CARRYING OUT SELF DIAGNOSIS WITHOUT INTERFERENCE

[75] Inventor: Taketoshi Inoue, Tokyo, Japan

[73] Assignee: NEC Corporation, Japan

[21] Appl. No.: 893,985

[22] Filed: Aug. 7, 1986

[30] Foreign Application Priority Data

Aug. 9, 1985 [JP] Japan .................................. 60-174243

[51] Int. Cl.⁴ .............................................. H04B 1/10
[52] U.S. Cl. .................................... 455/218; 455/212; 455/222; 375/104
[58] Field of Search ............... 455/218, 212, 222, 226; 375/104

[56] References Cited

U.S. PATENT DOCUMENTS

| | | | |
|---|---|---|---|
| 4,167,705 | 9/1979 | Martin, III | 455/218 |
| 4,355,417 | 10/1982 | Kozak, Jr. | 455/218 |
| 4,547,902 | 10/1985 | Kasperkovitz | 455/218 |
| 4,607,390 | 8/1986 | Faugeron | 455/212 |
| 4,630,290 | 12/1986 | Kage | 455/222 |

Primary Examiner—Robert L. Griffin
Assistant Examiner—Curtis Kuntz
Attorney, Agent, or Firm—Ostrolenk, Faber, Gerb & Soffen

[57] ABSTRACT

A circuit arrangement comprises a controller (20) for producing a control signal selectively indicative of normal and diagnosis modes. Responsive to the control signal, an IF stage (12) processes desired RF and diagnosis input signals into an IF signal of an IF level. Responsive to the IF signal and a reference signal of a reference level squelch signal producing circuit (15) produces a squelch signal when the IF level is lower than the reference level. First and second signal generators (26, 27) generate first and second threshold signals of first and second threshold levels, respectively. The second threshold level is lower than the first threshold level. Responsive to the control signal, a switch circuit (22) selects the first and the second threshold signals as a selected threshold signal. A line (29) supplies the selected threshold signal to the squelch signal producing circuit as the reference signal.

3 Claims, 4 Drawing Figures

RADIO RECEIVER FOR CARRYING OUT SELF DIAGNOSIS WITHOUT INTERFERENCE

BACKGROUND OF THE INVENTION

This invention relates to a circuit arrangement for use in a radio receiver, such as a superheterodyne receiver, having a self diagnostic function.

A radio receiver of the type described generally includes a signal detecting circuit, for example, a squelch circuit which is for use in a radio communication system, such as a time division multiple access (T.D.M.A.) system. The circuit arrangement of this invention includes a part of the squelch circuit.

The radio receiver has an antenna at which various radio signals of the radio communication system arrive. The radio signals are delivered to a radio frequency (RF) band-pass filter (B.P.F.) which produces a desired RF signal. The desired RF signal is supplied to the circuit arrangement as a circuit input signal. The squelch circuit comprises a squelch signal producing circuit for detecting whether or not the desired RF signal is received. The squelch signal producing circuit produces a squelch signal when the circuit input signal or desired RF signal is weaker than a predetermined threshold level.

It is assumed that the radio receiver normally receives the desired signal. Under the circumstances, it is possible to judge whether or not the radio receiver itself is defective into a defective state by monitoring the squelch signal. The squelch signal is produced by measuring a reception field intensity of the radio signals in the signal detecting circuit, such as the squelch circuit.

Thus, the squelch circuit also produces the squelch signal not only when the radio receiver is put into the defective state but also when the field intensity of the radio signals becomes weak.

Accordingly, the above-mentioned radio receiver is difficult to distinguish between absence of the circuit input signal and the defective state. Therefore, the above-mentioned radio receiver can be used only when the desired signal is normally received.

In order to remove such a disadvantage of the above-mentioned radio receiver, it might be considered to provide a diagnosis input signal generated in the receiver when the circuit input signal is absent. Such a circuit arrangement with a self diagnostic function is selectively operable in a normal mode in response to the circuit input signal and a diagnosis mode in response to the diagnosis input signal. The circuit arrangement with the self diagnostic function comprises a controller for producing a control signal selectively indicative of the normal and the diagnosis modes. Responsive to the control signal, a processing arrangement processes the circuit and the diagnosis input signals into a processed signal of a processed level when the control signal indicates the normal and the diagnosis modes, respectively. Responsive to the processed signal and a reference signal of a reference level, the squelch signal producing circuit produces the squelch signal when the processed and the reference levels have a predetermined relationship. The reference level will presently become clear.

In this circuit arrangement of the above-mentioned type, the diagnosis input signal must have a level which is higher than the predetermined threshold level. Therefore, the circuit arrangement is disadvantageous in that the diagnosis input signal is radiated from the antenna as an interference wave to other receivers of the communication system.

A radio receiver of another type has active and backup stations coupled to each other through a coaxial relay. The radio receiver of the other type may have a circuit arrangement described heretobefore. In such a radio receiver, the diagnosis input signal leaks into the active station when the diagnostic input signal is supplied to the backup station in order to check the backup station. Therefore, the radio receiver of the other type is disadvantageous in that the diagnosis input signal interferes with the circuit input signal applied to the active station when the diagnosis input signal is used to check the backup station.

SUMMARY OF THE INVENTION

It is an object of the present invention to provide a circuit arrangement for use in a radio receiver which can carry out self diagnosis without interference to other radio receivers.

A circuit arrangement to which this invention is applicable, is selectively operable in a normal mode and a diagnosis mode in response to a circuit input signal and a diagnosis input signal generated in the circuit arrangement, respectively, and comprises a controller for producing a control signal selectively indicative of the normal and the diagnosis modes, processing means responsive to the control signal for processing the circuit and the diagnosis input signals into a processed signal of a processed level when the control signal indicates the normal and the diagnosis modes, respectively, and squelch signal producing means responsive to the processed signal and a reference signal of a reference level for producing a squelch signal when the processed and the reference levels have a predetermined relationship. According to this invention, the circuit arrangement comprises first threshold signal generating means for generating a first threshold signal of a first threshold level, second threshold signal generating means for generating a second threshold signal of a second threshold level which is lower than the first threshold level, selecting means responsive to the control signal for selecting the first and the second threshold signals as a selected threshold signal when the control signal indicates the normal and the diagnosis modes, respectively, and means for supplying the selected threshold signal to the squelch signal producing means as the reference signal. The squelch signal producing means uses the first threshold level as the reference level when the control signal indicates the normal mode. The squelch signal producing means uses the second threshold level as the reference level when the control signal indicates the diagnosis mode.

DETAILED DESCRIPTION OF PREFERRED EMBODIMENTS

Figure 1:
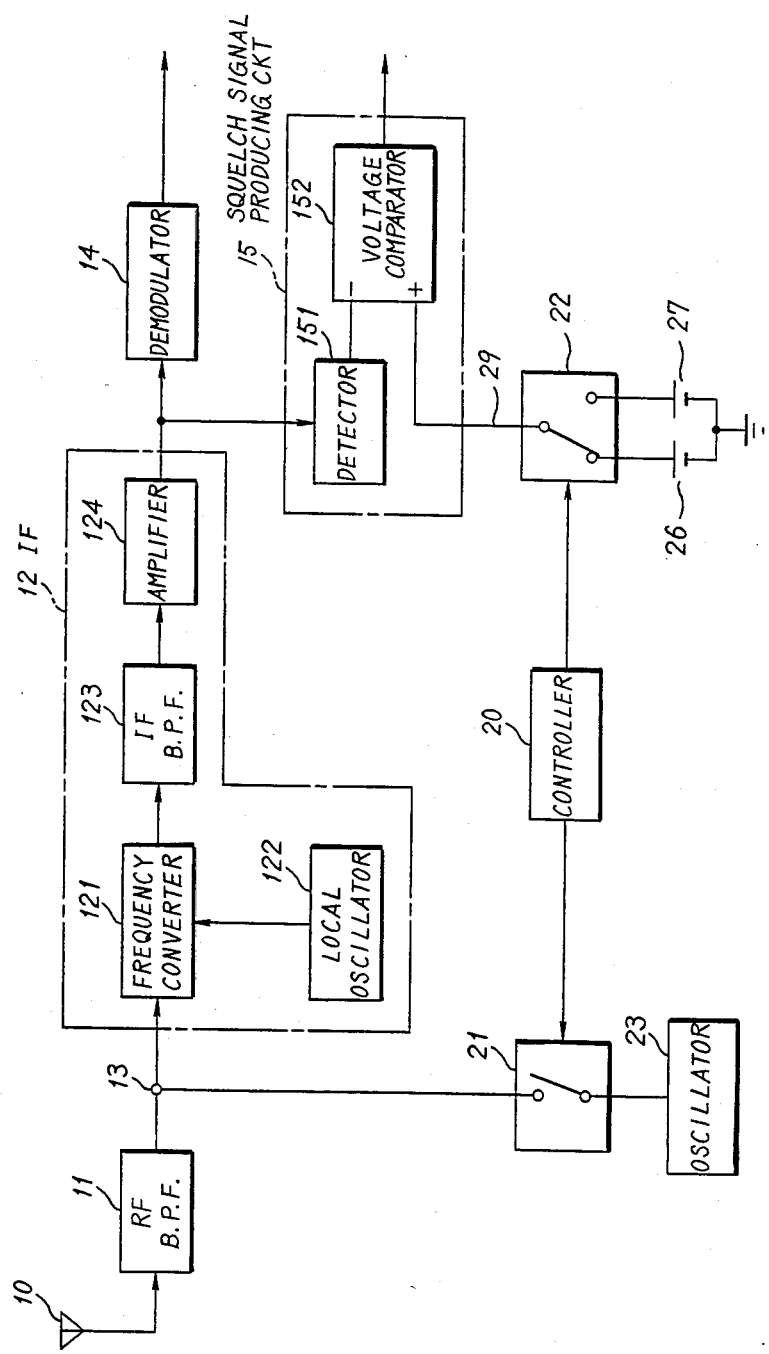
FIG. 1 is a block diagram of a circuit arrangement for use in a radio receiver according to a first embodiment of the present invention.

Referring to FIG. 1, a circuit arrangement according to a first embodiment of this invention is for use in a radio receiver and is selectively operable in a normal mode and a diagnosis mode. In the normal mode, the circuit arrangement responds to a circuit input signal. In the diagnosis mode, the circuit arrangement responds to a diagnosis input signal generated in the circuit arrangement.

The illustrated radio receiver is of a superheterodyne type and is coupled to an antenna 10. Various radio signals which arrive at the antenna 10 are delivered to an RF band-pass filter (B.P.F.) 11. Responsive to the radio signals, the RF B.P.F. 11 produces a desired RF signal as the circuit input signal. The desired RF signal is supplied to an intermediate frequency (IF) stage 12 which will later be described more in detail. The IF stage 12 is supplied with the desired RF signal via a junction terminal 13.

In the manner known in the art, the circuit arrangement comprises a controller 20 which produces a control signal selectively indicative of the normal and the diagnosis modes. A first switch circuit 21 is coupled to the junction terminal 13, the controller 20, and an oscillator 23. The control signal is delivered to a control terminal of the first switch circuit 21. Coupled to an input terminal of the first switch circuit 21 is the oscillator 23 which generates the diagnosis input signal. The oscillator 23 includes a noise source, for example, a Zener diode. In the example being illustrated, the diagnosis input signal has frequency component from D.C. to 2 GHz. When the control signal indicates the diagnosis mode, the first switch circuit 21 is turned on so that the diagnosis input signal is supplied to the IF stage 12 via the junction terminal 13.

The IF stage 12 comprises a frequency converter 121, a local oscillator 122, an IF B.P.F. 123, and an amplifier 124. The IF stage 12 operates in the known manner to convert the desired RF signal and the diagnosis input signal to an IF signal of an IF level. In this embodiment, the IF stage 12 acts as a processing arrangement. The IF signal corresponds to a processed signal. The IF level serves as a processed level. The IF signal is given to a conventional demodulator 14 to be demodulated into a baseband signal. The baseband signal is given to a suitable external circuit (not shown) to be processed in a known manner.

On the other hand, the IF signal is also given to a squelch signal producing circuit 15. The squelch signal producing circuit 15 comprises a detector 151 and a voltage comparator 152. The detector 151 detects the IF signal to produce an envelope signal which has a signal level corresponding to the IF level.

The envelope signal is supplied to an input terminal of the voltage comparator 152. A reference signal of a reference level is applied to another input terminal of the voltage comparator 152 in a manner to later be described. The voltage comparator 152 compares the IF and the reference levels to produce a squelch signal when the IF level is lower than the reference level.

The control signal is supplied also to a second switch circuit 22 which is coupled to first and second threshold signal generators 26 and 27. The first threshold signal generator 26 generates a first threshold signal of a first threshold level corresponding to a squelch level. The second threshold signal generator 27 generates a second threshold signal which has a second threshold level lower than the first threshold level. Responsive to the control signal, the second switch circuit 22 selects either one of the first and the second threshold signals as a selected threshold signal when the control signal indicates the normal and the diagnosis modes, respectively. The selected threshold signal is supplied to the squelch signal producing circuit 15 via a line 29 as the reference signal.

Operation of the radio receiver of FIG. 1 will be described more in detail below.

It will be assumed at first that the controller 20 produces the control signal indicative of the normal mode. In the normal mode wherein the circuit arrangement stationarily receives the desired RF signal, the first switch circuit 21 turns off. The second switch circuit 22 selects the first threshold signal.

Arriving at the antenna 10, the radio signals are delivered to the RF B.P.F. 11 which produces the desired RF signal. The desired RF signal is sent to the IF stage 12 which converts the desired RF signal to the IF signal. The signal is supplied to the demodulator 14 and to the squelch signal producing circuit 15.

When the second switch circuit 22 selects the first threshold signal as the reference signal in the normal mode, the squelch signal producing circuit 15 compares the IF and the first threshold levels. When the IF level is equal to or higher than the first threshold level, no squelch signal is produced from the squelch signal producing circuit 15. On the other hand, the squelch signal is produced from the squelch signal producing circuit 15, when the IF level is lower than the first threshold level.

It should be noted that the IF level is lower than the first threshold level not only when no desired RF signal is received at the circuit arrangement but also when the circuit arrangement is defective into a defective state.

It will now be assumed that the controller 20 produces the control signal indicative of the diagnosis mode. In the diagnosis mode wherein no desired RF signal is received at the circuit arrangement, the first switch circuit 21 is in an on-state during a predetermined time. The second switch circuit 22 selects the second threshold signal during the predetermined time. When the first switch circuit 21 turns on, the diagnosis input signal is sent from the oscillator 23 to the IF stage 12 via the junction terminal 13. When the IF stage 12 is not defective, the diagnosis input signal is converted by the IF stage 12 to the IF signal of an IF level which may be different from the IF level developed from the desired RF signal. Since the second switch circuit 22 selects the second threshold signal as the selected threshold signal in the diagnosis mode, the squelch signal producing circuit 15 compares the IF and the second threshold levels. The IF level is equal to or higher than the second threshold level when the IF stage 12 is not disabled. Therefore, no squelch signal is produced from the squelch signal producing circuit 15.

On the other hand, no IF signal is produced from the IF stage 12 when the IF stage 12 is defective. In this event, the IF level becomes lower than the second threshold level and, as a result, the squelch signal is produced from the squelch signal producing circuit 15.

In the diagnosis mode, the diagnosis input signal is scarcely radiated from the antenna 10 via the RF B.P.F. 11, if a level of the diagnosis input signal is very low. Therefore, the diagnosis input signal does not interfere with the other receivers of the communication system as a spurious signal.

Figure 2:
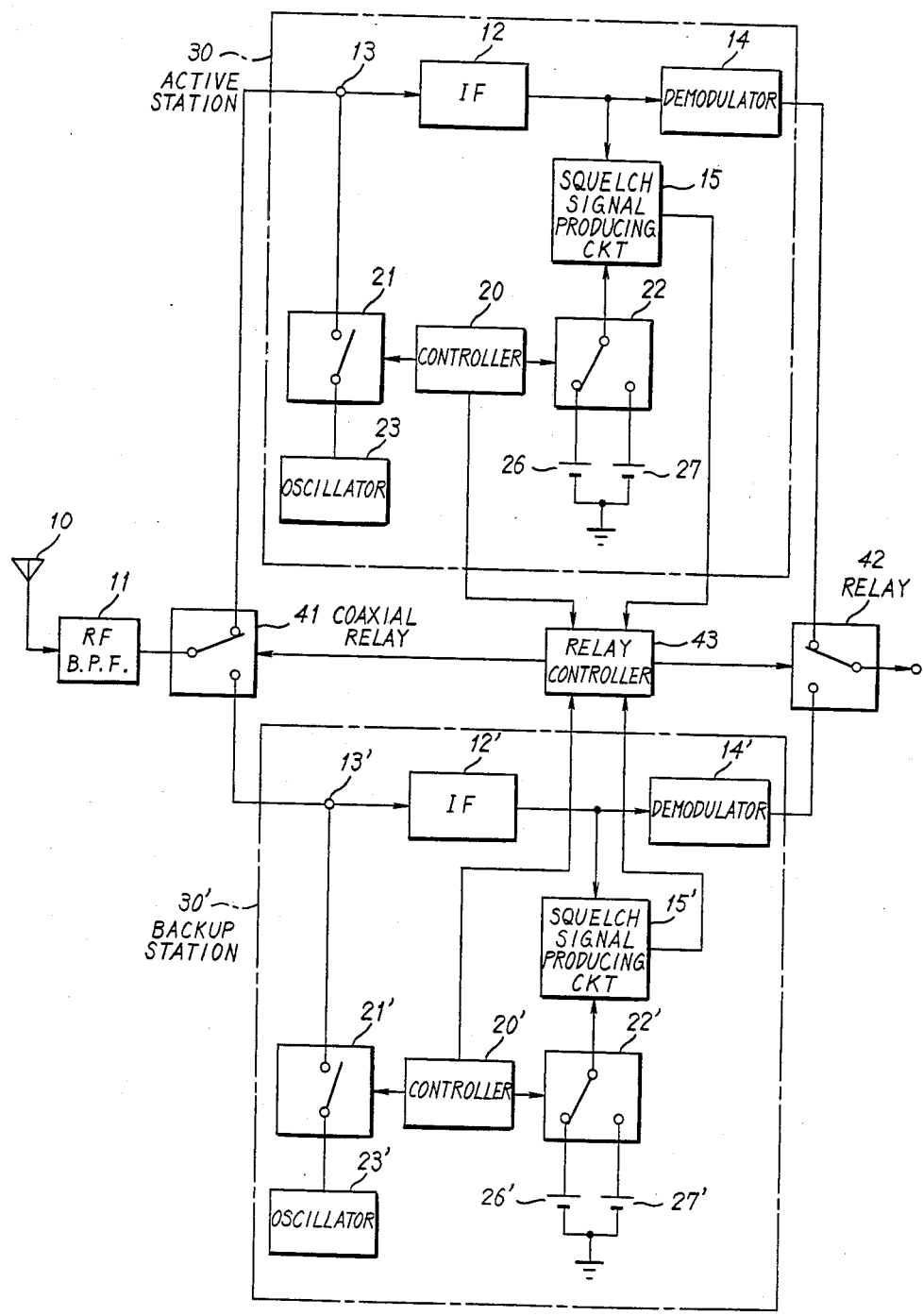
FIG. 2 is a block diagram of a radio receiver which comprises active and backup stations, each comprising the circuit arrangement illustrated in FIG. 1.

Referring to FIG. 2, a radio receiver has active and backup stations 30 and 30' each of which is similar in structure and operation to that illustrated in FIG. 1. Similar parts of the active station 30 are designated by like reference numerals while the corresponding parts of the backup station 30' are designated by like reference numerals accompanied by primes ('). Detailed description is omitted for the purpose of simplification of the description.

The illustrated radio receiver comprises a first relay 41 for selectively connecting one of the active and the backup stations 30 and 30' to the RF B.P.F. 11 and a second relay 42 for selecting either one of the active and the backup stations 30 and 30'. The first relay 41 may be a coaxial relay. The first relay 41 and the second relay 42 are controlled by a relay controller 43 for delivering a switching signal to the first relay 41 and the second relay 42 in response to the control signal and the squelch signal. Consequently, the junction terminal 13 of the active station 30 and the junction terminal 13' of the backup station 30', are selectively connected to the RF B.P.F. 11 through the first relay 41 while either the demodulator 14 of the active station 30 or the demodulator 14' of the backup station 30' is selected by the second relay 42.

In the diagnosis mode of the active station 30, the controller 20 of the active station 30 supplies the relay controller 43 with an additional control signal indicative of the diagnosis mode in addition to the control signal delivered to the first and the second switch circuits 21 and 22 of the active station 30. Responsive to the additional control signal, the relay controller 43 selects the active station 30 as long as the squelch signal is not produced from the squelch signal producing circuit 15 of the active station 30. Therefore, the first relay 41 and the second relay 42 are not changed over so that the circuit arrangement continues to select the active station 30.

On the other hand, the relay controller 43 produces the switching signal in the diagnosis mode of the active station 30 when the squelch signal is produced from the squelch signal producing circuit 15. Responsive to the switching signal, the first relay 41 and the second relay 42 are switched from the active station 30 to the backup station 30'. As a result, the backup station 30' is put into an active state. This structure enables a normal operation of the circuit arrangement even when either of the active and the backup stations 30 and 30' becomes defective. Accordingly, the circuit arrangement has an improved reliability.

In the diagnosis mode of the backup station 30', the backup station 30' carries out an operation similar to that of the active station 30. Anyway, the diagnosis input signal is delivered from the oscillator 23' of the backup station 30' to the IF stage 12' via the junction terminal 13'.

It is to be noted here that this diagnosis input signal does not leak to the active station 30 via the first relay 41 because the diagnosis input signal has a level lower than a level of a conventional diagnosis input signal and the first relay 41 usually has an isolation of 20 dB through 30 dB. Therefore, the diagnosis input signal does not interfere with the desired RF signal applied to the active station 30 even when the backup station 30' is in the diagnosis mode.

Figure 3:
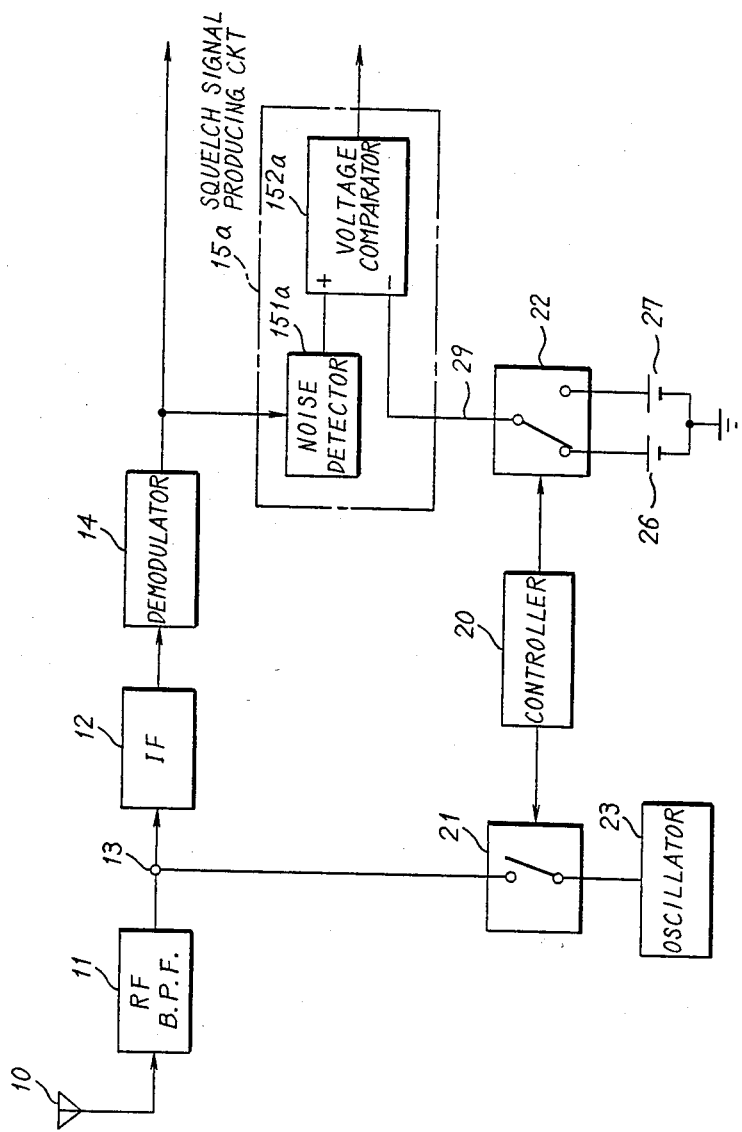
FIG. 3 is a block diagram of a circuit arrangement for use in a radio receiver according to a second embodiment of the present invention.

Referring to FIG. 3, a circuit arrangement according to a second embodiment of this invention comprises similar parts which are designated again by like reference numerals. In FIG. 3, a squelch signal producing circuit 15a is coupled to the demodulator 14.

More particularly, the illustrated squelch signal producing circuit 15a is operable in response to a baseband signal supplied from the demodulator 14. The baseband signal may be called a processed signal and includes a baseband noise of a noise level. The noise level may be made to correspond to a processed level.

With this structure, a combination of the IF stage 12 and the demodulator 14 acts as a processing arrangement for producing the processed signal. The processed signal is sent to any external circuit to be further processed thereby. The squelch signal producing circuit 15a comprises a noise detector 151a and a voltage comparator 152a. The noise detector 151a detects the noise level of the baseband noise to produce a noise level signal representative of the noise level. The noise level signal is applied to an input terminal of the voltage comparator 152a. Applied to another input terminal of the voltage comparator 152a is the reference signal which is supplied from either of the first and the second threshold signal generators 26 and 27 via the line 29. Responsive to the noise level signal and the reference signal, the voltage comparator 152a compares the noise level with the reference level to produce the squelch signal when the noise level has a predetermined relation to the reference level.

Description will be made as regards operation of the circuit arrangement of FIG. 3.

In the normal mode, the controller 20 makes the first switch circuit 21 turn off and renders the second switch circuit 22 to select the first threshold signal. Arriving at the antenna 10, the radio signals are delivered as in FIG. 1 to the RF B.P.F. 11 which produces the desired RF signal. The desired RF signal is converted to the baseband signal by the IF stage 12 and the demodulator 14. The baseband signal is supplied to the squelch signal producing circuit 15a.

Since the second switch circuit 22 selects the first threshold signal as the selected threshold signal, the squelch signal producing circuit 15a compares the noise and the first threshold levels. When the circuit arrangement normally receives the desired RF signal and when both the IF stage 12 and the demodulator 14 are not disabled, the noise level is equal to or lower than the first threshold level so that no squelch signal is produced from the squelch signal producing circuit 15a. On the other hand, the squelch signal is produced from the squelch signal producing circuit 15a when the desired RF signal is intercepted or when the IF stage 12 and/or the demodulator 14 are disabled so that the noise level is higher than the first threshold level.

In the diagnosis mode, the controller 20 similarly makes the first switch circuit 21 turn on during the predetermined time. The second switch circuit 22 selects the second threshold signal as the selected threshold signal during the predetermined time. Since the first switch circuit 21 turns on, the diagnosis input signal is similarly delivered from the oscillator 23 to the IF stage 12 via the junction terminal 13.

When both the IF stage 12 and the demodulator 14 are not disabled, the diagnosis input signal is converted by the IF stage 12 and the demodulator 14 to the baseband signal which includes almost no noise signal. Therefore, the noise level is equal to or lower than the second threshold level so that no squelch signal is produced from the squelch signal producing circuit 15a. On the other hand, the diagnosis input signal is converted by the IF stage 12 and the demodulator 14 to the baseband signal including noise signal of a high noise level when either or both of the IF stage 12 and the demodulator 14 are disabled. Therefore, the noise level is higher than the second threshold level so that the squelch signal is produced from the squelch signal producing circuit 15a. In the manner described in conjunction with FIG. 1, the circuit arrangement of FIG. 3 can correctly judge whether or not the circuit arrangement is defective. Furthermore, the diagnosis input signal does not interfere with the other receivers of the communication system as the spurious signal.

Figure 4:
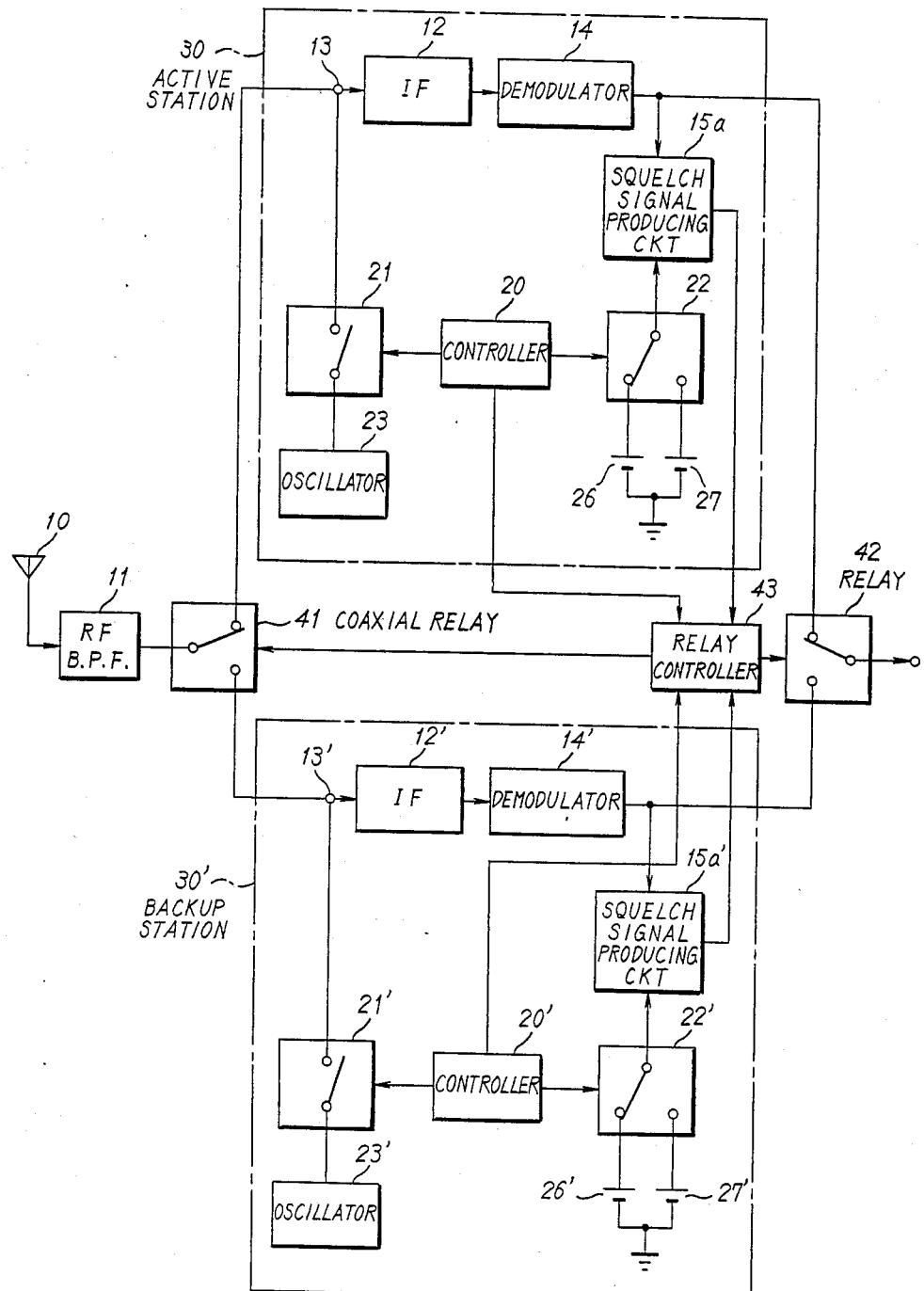
FIG. 4 is a block diagram of a radio receiver which comprises active and backup stations, each comprising the circuit arrangement depicted in FIG. 3.

Referring to FIG. 4, a radio receiver comprises active and backup stations 30a and 30a' as in FIG. 2. Similar parts are designated by like reference numerals. Operation of the circuit arrangement of FIG. 4 is similar to that of the circuit arrangement of FIG. 2. Detailed description will be omitted for the purpose of simplification of the description.

While the present invention has thus far been described in conjunction with a few embodiments thereof, it will readily be possible for those skilled in the art to put this invention into practice in various other manners. For example, it is possible to omit the first switch 21 with the oscillator 23 directly controlled by the control signal for generation and suspension of the diagnosis input signal.

What is claimed is:

1. A circuit arrangement which is selectively operable in a normal mode and a diagnosis mode in response to a circuit input signal and a diagnosis input signal generated in said circuit arrangement, respectively, and comprises a controller for producing a control signal selectively indicative of said normal and said diagnosis modes, processing means responsive to said control signal for processing said circuit and said diagnosis input signals into a processed signal of a processed level when said control signal indicates said normal and said diagnosis modes, respectively, and squelch signal producing means responsive to said processed signal and a reference signal of a reference level for producing a squelch signal when said processed and said reference levels have a predetermined relationship, wherein the improvement comprises:

first threshold signal generating means for generating a first threshold signal of a first threshold level;

second threshold signal generating means for generating a second threshold signal of a second threshold level which is lower than said first threshold level;

selecting means responsive to said control signal for selecting said first and said second threshold signals as a selected threshold signal when said control signal indicates said normal and said diagnosis modes, respectively; and means for supplying said selected threshold signal to said squelch signal producing means as said reference signal, said squelch signal producing means using said first threshold level as said reference level when said control signal indicates said normal mode, said squelch signal producing means using said second threshold level as said reference level when said control signal indicates said diagnosis mode.

2. A circuit arrangement as claimed in claim 1, wherein said processing means comprises an intermediate frequency stage for converting said circuit and said diagnosis input signals into an intermediate frequency signal to produce said intermediate frequency signal as said processed signal, said intermediate frequency signal having an intermediate frequency level as said processed level, said squelch signal producing means being for producing said squelch signal when said intermediate frequency level is lower than said reference level.

3. A circuit arrangement as claimed in claim 1, wherein said processing means comprises an intermediate frequency stage for converting said circuit and said diagnosis input signals into an intermediate frequency signal, and a demodulator for converting said intermediate frequency signal into a baseband signal to produce said baseband signal as said processed signal, said baseband signal including baseband noise of a noise level as said processed level, said squelch signal producing means being for producing said squelch signal when said noise level is higher than said reference level.

* * * * *